(12) United States Patent
Warke et al.

(10) Patent No.: US 11,752,471 B2
(45) Date of Patent: Sep. 12, 2023

(54) POROUS SINTERED MEMBRANES AND METHODS OF PREPARING POROUS SINTERED MEMBRANES

(71) Applicant: ENTEGRIS, INC., Billerica, MA (US)

(72) Inventors: Virendra Warke, North Chelmsford, MA (US); Devon N. Dion, Tewksbury, MA (US); David Smith, Leominster, MA (US); Christopher Reddy, Cayucos, CA (US); Meghan Patrick, Watertown, MA (US)

(73) Assignee: ENTEGRIS, INC., Billerica, MA (US)

( * ) Notice: Subject to any disclaimer, the term of this patent is extended or adjusted under 35 U.S.C. 154(b) by 131 days.

(21) Appl. No.: 16/925,212

(22) Filed: Jul. 9, 2020

(65) Prior Publication Data

US 2021/0016347 A1    Jan. 21, 2021

Related U.S. Application Data

(60) Provisional application No. 62/876,160, filed on Jul. 19, 2019.

(51) Int. Cl.
| | |
|---|---|
| *B01D 67/00* | (2006.01) |
| *B22F 3/22* | (2006.01) |
| *B22F 5/10* | (2006.01) |
| *B01D 69/04* | (2006.01) |
| *B01D 53/22* | (2006.01) |
| *C08K 7/04* | (2006.01) |
| *C08L 71/02* | (2006.01) |
| *C08L 91/06* | (2006.01) |
| *B01D 69/06* | (2006.01) |
| *B22F 1/062* | (2022.01) |
| *B22F 1/10* | (2022.01) |

(52) U.S. Cl.
CPC ......... *B01D 67/0041* (2013.01); *B01D 53/22* (2013.01); *B01D 69/04* (2013.01); *B01D 69/06* (2013.01); *B22F 1/062* (2022.01); *B22F 1/10* (2022.01); *B22F 3/225* (2013.01); *B22F 5/106* (2013.01); *C08K 7/04* (2013.01); *C08L 71/02* (2013.01); *C08L 91/06* (2013.01); *B01D 2053/221* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,104,077 A | * | 8/1978 | Kobayashi | B01D 39/2093 252/62 |
| 5,177,035 A | * | 1/1993 | Gee | B01D 39/2093 264/43 |
| 5,195,319 A | * | 3/1993 | Stobbe | B01D 39/2075 60/299 |
| 5,250,094 A | * | 10/1993 | Chung | B01D 39/2086 55/DIG. 30 |
| 5,814,272 A | | 9/1998 | Zeller | |
| 6,008,281 A | | 12/1999 | Yang | |
| 6,341,701 B1 | | 1/2002 | Takahashi | |
| (Continued) | | | | |

FOREIGN PATENT DOCUMENTS

| CN | 101903125 A | 12/2010 |
|---|---|---|
| CN | 106660119 A | 5/2017 |

*Primary Examiner* — Jason M Greene

(57) ABSTRACT

Described are porous sintered bodies and methods of making porous sintered bodies by steps that include an injection molding step.

11 Claims, 7 Drawing Sheets

(56) References Cited

U.S. PATENT DOCUMENTS

| | | | |
|---|---|---|---|
| 6,410,160 B1* | 6/2002 | Landin | B22F 3/1007 |
| | | | 264/662 |
| 6,946,817 B2 | 9/2005 | Fischer | |
| 7,195,735 B2 | 3/2007 | Date | |
| 7,241,416 B2 | 7/2007 | Sweetland | |
| 8,747,525 B2 | 6/2014 | Kratzer | |
| 9,272,333 B2 | 3/2016 | Tanaka | |
| 2003/0022954 A1* | 1/2003 | Masawaki | B01D 71/48 |
| | | | 524/1 |
| 2006/0002810 A1* | 1/2006 | Grohowski | B01D 39/2093 |
| | | | 419/2 |
| 2006/0273005 A1* | 12/2006 | Love | B01D 39/2034 |
| | | | 210/500.25 |
| 2009/0165651 A1* | 7/2009 | Burgess | B01D 39/2044 |
| | | | 55/495 |
| 2009/0320428 A1* | 12/2009 | Soyama | B01D 39/2024 |
| | | | 55/527 |
| 2014/0007772 A1 | 1/2014 | Schwartz | |
| 2015/0266094 A1 | 9/2015 | Torres | |
| 2015/0370213 A1* | 12/2015 | Iikura | G03G 15/751 |
| | | | 399/117 |
| 2016/0326056 A1 | 11/2016 | Chen | |
| 2018/0078881 A1* | 3/2018 | Suzuki | B01D 39/083 |
| 2018/0326402 A1 | 11/2018 | Suchanek | |
| 2021/0341324 A1* | 11/2021 | Tsuchiya | G01F 5/00 |

* cited by examiner

POROUS SINTERED MEMBRANES AND METHODS OF PREPARING POROUS SINTERED MEMBRANES

FIELD

The described invention relates to porous sintered bodies, including methods of making porous sintered bodies by steps that include an injection molding step.

BACKGROUND

Porous, sintered bodies find uses in a variety of industrial applications, including filtering of materials used in the electronics and semiconductor manufacturing industries, as well as other industries that require highly pure materials for processing. For example, in the semiconductor and microelectronics industries, in-line filters are often used to remove particulate matter from fluids to prevent introduction of the particulate matter into a manufacturing process. The fluid may be in the form of a gas or a liquid.

Currently, common methods of preparing porous sintered bodies commercially include forming and sintering steps that involve manually moving and handling intermediate (in-process) forms of a porous body. These steps are labor intensive. Moreover, the bodies are fragile and the forming steps can be imprecise. These features cause the methods to be prone to substantial waste, undesirably low efficiencies, and undesirably high costs.

SUMMARY

Described herein are alternative techniques for forming porous sintered bodies. The disclosed methods do not suffer comparable inefficiencies and cost disadvantages of current techniques, but replace labor-intensive, less precise, potentially variable manual steps with a more precise, less labor-intensive injection molding step. The injection molding step can be more automated, more precise, and can produce lower amounts of waste compared to previous and currently-used methods of forming porous sintered bodies. A method as described can be performed to achieve high volume production of highly repeatable (precise) porous sintered bodies. Current (non-injection molding) commercial processes, hindered by manual and labor intensive steps, may perform at production yields in a range from 60 to 80 percent. In comparison, a well-controlled and automated injection molding process as presently described has the potential to achieve improved uniformity and precision (e.g., reduced intra-part, inter-part (part-to-part), and batch-to-batch variations), at higher production volumes (increased throughput), lower waste, and higher yields.

Metal injection molding techniques have been used for preparing bodies of relatively low porosity, whereas the present invention is capable of producing bodies of higher porosity. Currently commercial examples of metal injection molding methods involve injection compositions ("feedstock") and resultant sintered bodies that contain a high amount of particles and a relatively low porosity, often or typically having a target of less than 1 percent porosity (percent void space by volume) for an injected metal part. While not normally trying to produce metal parts with higher porosity, the metal injection molding methods and materials that are used may be capable of producing injection molded metal parts having somewhat higher porosity levels, e.g., up to 15, 20, 25, or 30 percent by volume void space, and a corresponding solids (metal) percent of a resultant sintered body of a least 70 percent.

In contrast, methods of the present description can use injection compositions that contain a relatively lower percentage of particles, e.g., from 20 to 50 percent (by volume) particles, and from 50 to 80 percent binder. The process can correspondingly produce a finished porous sintered body having a porosity in a range from 50 to 80 percent. To successfully perform processing in this manner, it has surprisingly been found that particles used to form the sintered porous body can be selected to exhibit a relatively low "relative apparent density," which can be a function of the form (e.g., shape) of the particles.

In one aspect, disclosed is a method of making a porous sintered body by particle injection molding a liquid injection composition into a shaped mold cavity. The liquid injection composition contains: polymeric binder, and from 20 and 50 percent by volume solid inorganic particles, based on total volume of the liquid injection composition. The method includes: flowing the liquid injection composition into the shaped mold cavity, and causing the liquid binder to solidify within the shaped mold cavity to form a solidified injection composition comprising solid binder surrounding the solid inorganic particles.

In another aspect, disclosed is a liquid injection composition that includes: from 50 to 80 percent by volume polymeric binder, and from 20 and 50 percent by volume solid inorganic particles having a relative apparent density in a range from 5 to 35 percent of a theoretical density of the particles, based on total volume of the liquid injection composition.

In another aspect, disclosed herein is an injection molded porous sintered body that includes sintered particles and that has a porosity in a range from 50 to 80 percent.

BRIEF DESCRIPTION OF THE DRAWING

The disclosure may be more completely understood in consideration of the following description of various illustrative embodiments in connection with the accompanying figures.

DETAILED DESCRIPTION

Figure 1:
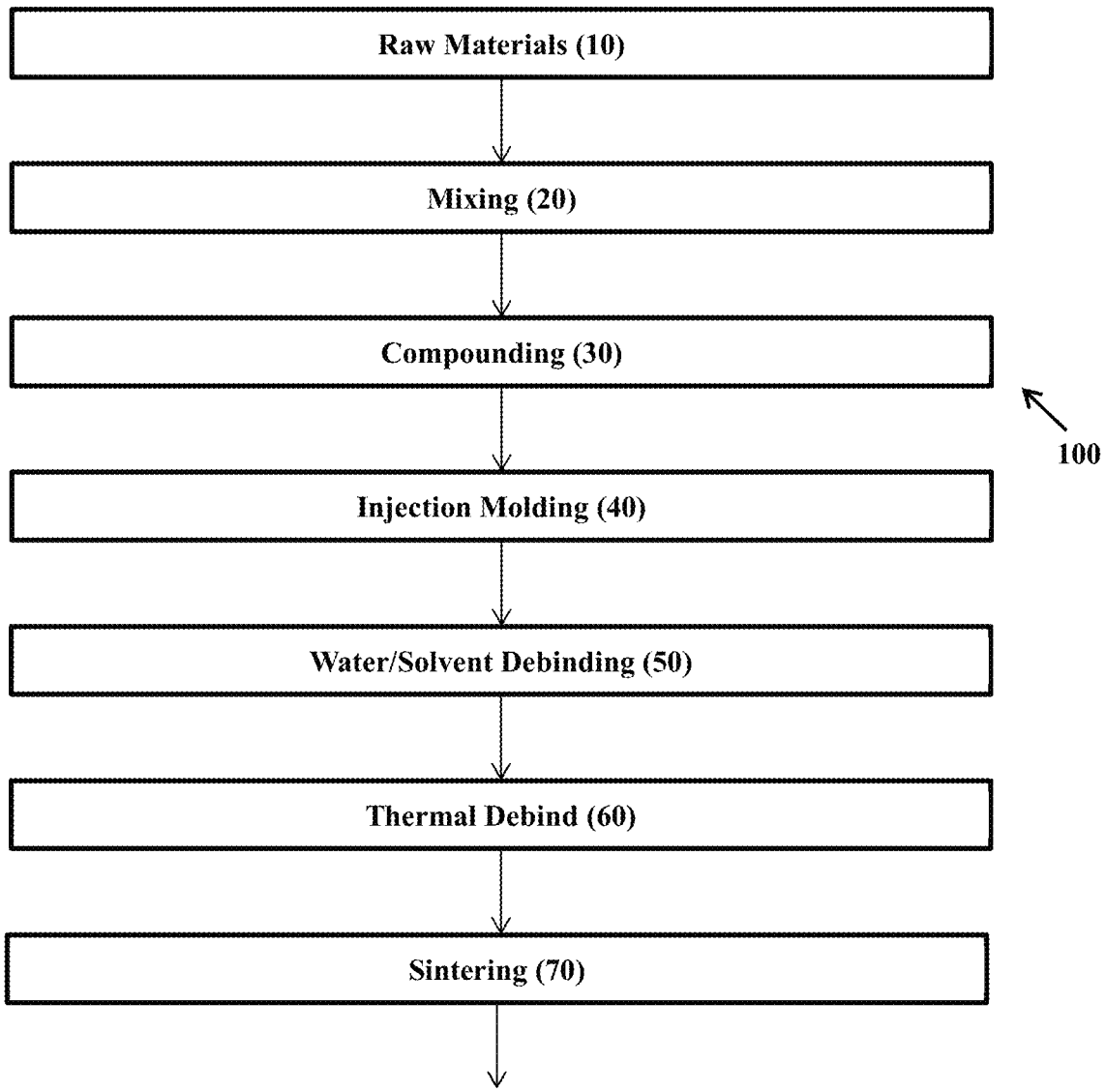
FIG. 1 shows example steps of a method as described of forming a porous sintered body.

According to the following description, porous sintered membranes are prepared by injection molding methods, such as by techniques sometimes referred to as "particle injection molding" techniques or, more specifically with respect to the use of metal particles, "metal injection molding" techniques, or "MIM." The described methods involve the use of an injection composition that contains inorganic (e.g., metal) particles and polymeric binder. The injection composition, as a liquid, is flowed (injected) into a mold cavity and allowed to solidify within the mold cavity to form a solidified injection composition in the form of a solidified molded body. The solidified molded body can be removed from the cavity and is in a form that is self-supporting. The molded body, while potentially fragile, can be handled and further processed by steps that include removing the polymeric binder and sintering the inorganic (e.g., metal) particles to form a porous sintered body.

The resultant porous sintered body comprises (or consists of or consists essentially of) a solid (e.g., rigid or semi-rigid) matrix of fused and thereby interconnected particles. The matrix is porous (e.g., highly porous), with the particles of the matrix having become connected together (e.g., "interconnected"), at adjacent surfaces, during a sintering step.

The porous body can be in the form of a membrane that may have a shape of a flat sheet, e.g., a substantially planar, essentially two-dimensional (having a very small thickness) flat sheet or membrane. However, injection molding techniques for forming these bodies can provide increased flexibility in selecting a shape or form of a molded body. Other examples of shapes of a porous body can be non-planar, e.g., three-dimensional. For example, a porous body may be in the form of a curved or rounded plate or "cup." Alternately, a porous body may be three dimensional, e.g., an annular membrane, such as in the form of a tube having a round or circular cross-section when viewed along an axis of the tube, i.e., a cylinder. Other tubes may have non-circular shapes in cross section, such as a shape that includes angles, corners, or a pleated pattern (multi-pointed star, or a circular "zig-zag" pattern). The membrane (in any shape) includes two opposed major surfaces, and a thickness between the two opposed major surfaces.

A thickness of the membrane (e.g., a thickness of a body wall of a tube or cylinder) can be in a range that is effective for use of the porous body as a filter. Examples of useful thicknesses may be in a range from 0.5 to 5 millimeters, e.g., from 1 to 4 millimeters.

The porous body has a relatively high porosity, e.g., from 50 to 80 percent, or from 55 to 75 percent, and can have other useful properties relevant to performance of the porous body as a filter membrane, e.g., flow properties and retention properties as these are known to be required for a useful filter membrane. As used herein, and in the art of porous sintered bodies, a "porosity" of a porous sintered body (also sometimes referred to as void fraction) is a measure of the void (i.e. "empty") space in the body as a percent of the total volume of the body, and is calculated as a fraction of the volume of voids of the body over the total volume of the body. A body that has zero percent porosity is completely solid.

Methods of preparing the porous body include a step of injection molding an injection composition by injecting the injection composition into a mold cavity as a liquid (i.e., a "liquid injection composition") to form a molded body. The molded body is allowed or caused to solidify within the mold cavity to form a solidified molded body. In subsequent steps the molded body can be removed from the mold cavity, the polymeric binder can be separated from the particles of the molded body, and the particles can be fused together by a sintering step to form a self-supporting porous sintered body.

The injection composition contains polymeric binder, with inorganic particles distributed throughout the polymeric binder. To allow processing of the particles to form a porous membrane by steps that include injection molding, the particles are selected to exhibit physical properties, including morphology (including shape) and density properties, that allow the particles to be included in the injection composition in a relatively low amount, but to still become interconnected to form a self-supporting body by a sintering step. More specifically, the particles have a low "relative apparent density." With a low "relative apparent density," the particles can be present in a low volume percentage within the injection composition, such as in an amount of less than 50 percent by volume particles based on total volume injection composition, while still being capable of being processed to form a self-supporting porous sintered body. With a low "relative apparent density," the particles, even when present at a low percentage of the volume of the injection composition, can still be capable of being effectively fused together by sintering to form a useful porous sintered body, e.g., a porous body that is "self-supporting," made of fused interconnected particles, and, as one example, is useful as a filter membrane as described herein.

The particles, as a collection, have physical properties that include size, shape, and density that allow the particles to be distributed within a liquid polymeric binder at a relatively low volumetric amount, yet to be still processable by injection molding and sintering to form a useful (e.g., interconnected and self-supporting) porous sintered body. A low volumetric amount of the particles in the injection composition is desired so that a resultant sintered body exhibits a relatively high porosity, so that the sintered body can be effectively used as a filter membrane. Yet, even at a low volumetric amount in the injection composition (to produce a high porosity sintered body), the particles contained in the injection composition must have sufficient proximity between a sufficient amount of adjacent surfaces to become effectively fused and interconnected upon sintering, so that the particles that form the sintered body are highly interconnected and, therefore, the sintered body is self-supporting.

As used herein, a body that is "self-supporting" is a body that is capable of supporting its own weight for a useful period of time (e.g., between processing steps), in a given form or shape, without collapsing and preferably without sagging to more than an insignificant degree. A sintered body as described herein that is self-supporting can be handled, moved (some self-supporting bodies are fragile and require a high degree of care for moving), and further processed without the need for support from another structure such as a polymeric binder.

Specifically with respect to a self-supporting sintered body, a collection of particles can be formed into a sintered body that is self-supporting if the collection of (e.g., molded) particles includes a sufficiently high percentage of particles that are sufficiently close to each other (e.g., having contacting or near-contacting surfaces) to become fused together (i.e., "connected" or "interconnected") when sintered. Preferably, a high percentage of the particles of an injection composition are located sufficiently close together, e.g., have at least one surface that contacts or nearly contacts at least one other particle surface, so that most or essentially all of the particles (e.g., 95, 99, or 99.9 percent of the total amount of particles) of the injection composition become a fused particle of the sintered porous body. The high degree of contact or proximity (near contact) between particle surfaces can be present in a molded body contained in a mold cavity in the form of a solidified injection composition. The high degree of contact or proximity between the particle surfaces also remains during a solvent debind step and during and after a thermal debind step. The body, after the thermal debind step and before a sintering step, will consist of only the particles, having a high degree of contact or proximity between adjacent particle surfaces, with void space between the surfaces; this body can be self-supporting even if not held together by a polymer and even though particles are not yet fused by sintering, but due only to the high degree of proximity and contact between the particles of the body.

To be effective to form a self-supporting porous sintered body by injection molding and sintering, the size, shape, and density features of the particles allow the particles to be formed into a molded body (e.g., a solidified injection composition contained within a mold cavity) that includes the particles distributed within the polymeric binder, with a high degree of proximity and contact between the particles, yet also with an amount of void space that results in a useful (relatively high) porosity of a resultant porous sintered body. As part of the injection composition, especially as part of a solidified injection composition, the particles are spaced apart from each other to a degree that is sufficient to cause a resultant sintered body to have a void space (porosity) that allows the sintered body to be effective as a filter membrane. At the same time, the particles have an amount of proximity or contact between their surfaces so that when the molded body is subsequently processed to remove the polymer, the remaining particles alone (absent the polymer) form a self-supporting body. The same high degree of contact or proximity between the particles also allows the particles (after removal of all of the polymer) to be subsequently processed by sintering, with the particles becoming fused together and interconnected to a degree that the resultant sintered body is self-supporting.

Referring to FIG. 1, a method as described involves the use of raw materials (10) that include inorganic particles, polymeric binder, and optional ingredients effective for forming a useful injection composition.

Useful inorganic particles include inorganic particles that can be processed as described herein, including by being effectively formed into a liquid injection composition for dispensing into a mold cavity to form a molded body, followed by forming a self-supporting body that consists of the particles alone that can then be processed by a sintering step that effectively causes the particles to become fused together to form an interconnected self-supporting porous sintered body.

The particles can be in the form of a collection of small particles, e.g., as a powder, with the particles being in any of various known particle forms such as individual particles referred to as "agglomerated particles," "dendritic particles," or "fibrous particles," among others. The particles can be of any size or size range that is effective, including small or relatively small particles on a scale of microns (e.g., having an average size of less than 500 microns, less than 100 microns, less than 50 microns, 10 microns, or less than 5 microns).

The particles can include one or more different types of inorganic materials, including particles made of metal, particles made of ceramic, or a combination of both ceramic particles and metal particles. The term "metal" as used herein refers to any metallic or metalloid chemical element or an alloy of two or more of these elements.

The particles can be selected to achieve effectiveness in processing as described, to be capable of being injection molded, formed into a molded self-supporting body that consists of the particles, and then sintered to form a self-supporting porous sintered body that will effectively perform as a filter membrane. The size, shape, and chemical makeup of the particles can be any that are effective for these purposes. In some embodiments, particles that have been identified as being useful as described herein, e.g., capable of being processed by injection molding to form a porous sintered body as described (that is made of particles that interconnected, that is self-supporting, and that also exhibits a relatively high porosity and effective flow and filtering properties) can be selected based on size, shape (including morphology), and density properties.

Density properties of selected particles can be described as apparent density (a.k.a. bulk density), and as relative apparent density (apparent density divided by theoretical (or "particle" density)). Example particles made of nickel, nickel alloy, or stainless steel, measured in powder form, can have an apparent ("bulk") density that is below 2 grams per cubic centimeter (g/cc), e.g., below 1.8 g/cc, or below 1.5 g/cc. Other materials may have higher density values (e.g., refractory metals) or lower apparent density values (e.g., certain ceramic materials). As is known, an apparent (bulk) density of a powder (collection of particles) refers to the mass of the powder for a given volume of the powder, with the volume including volume of the particles as well as volume of spaces between the particles in powder form. Methods for measuring apparent (bulk) density are well known, and include ASTM B703-17 "Standard Test Method for Apparent Density of Metal Powders and Related Compounds Using the Arnold Meter."

Example particles in the form of a powder can also be selected to have a "relative apparent density" that allows for processing as described, to produce a porous sintered body by steps that include an injection molding step. As identified herein, particles can be selected based on relative apparent density to allow the particles to be successfully processed by injection molding and subsequent sintering to produce a porous sintered body having a desirably high porosity, and also with particles that are interconnected and that form a self-supporting body. As used herein, and as commonly understood, the term "relative apparent density" is calculated as a ratio of an apparent density of a powder divided by a theoretical density of the powder. The theoretical density of a collection of particles (e.g., powder), also sometimes referred to as a "particle density" of the particles, refers to the density of the material (e.g., metal, ceramic) that makes up the particles, e.g., the density (mass per volume) of a single particle, or a density of a collection of particles that is calculated based on weight per volume, with the volume calculated to include only the volume of the particles and not the volume of void space between the particles. Example particles that are useful according to methods as described can be in the form of a powder having a relative apparent density in a range from 5 to 35 percent of the theoretical density.

According to the present description, it has been determined that particles that exhibit a low "relative apparent density" can be processed by injection molding to form a porous sintered body that has a high porosity and a correspondingly low solids loading (below 50 percent) (i.e., a high porosity). The low relative apparent density particles have physical shape and size properties that cause a high degree of contact or proximity between surfaces of the particles when included in an injection composition (even if present at a low amount (a low volume percent) in the injection composition), with a high void space between particles. The high degree of contact or proximity between surfaces of the particles is also present in bodies that are formed from the injection composition, e.g., by molding. With a high degree of contact or proximity between the particle surfaces, even with a high void space, the polymeric binder can be removed and the particles will remain in a form of a free-standing, self-supporting body that can be further processed by sintering to cause the particles to fuse together sufficiently at their surfaces to become interconnected and self-supporting, to form a useful porous sintered membrane.

A relatively low "relative apparent density" is a property of a collection of particles that can be directly affected by physical size and shape properties of the particles. Size and shape properties of inorganic powders (made of metal or ceramic) can vary greatly, with known particles having many different shapes. Some examples of common particle shapes include those referred to as spherical, rounded, angular, flakey, cylindrical, acicular, cubic, columnar, dendritic, fibrous, elongated, and branched. Other particle shapes, and other terms used to describe specific shapes, are also known. Different types of particles may also be agglomerated or non-agglomerated, or "fibrous." Certain types of particles, or branches or fibrils thereof, that have a predominant length dimension relative to small thickness and width dimensions can be characterized by as having a high aspect ratio.

Particles useful in injection molding methods as described have shape and size features that cause the particles to exhibit a low relative apparent density, e.g., to form a collection of particles that as a powder includes a high level of void space between particles, e.g., a low packing density. Size and shape features of particles that have a low relative apparent density include features that cause a low packing density ("packing efficiency"). Shape features of particles that can produce low packing density (and high void space) include: irregular (non-geometric) shape features that include multiple fibrils or branches in random (non-repeating) arrangements between particles; an elongate shape of particles or portions of particles (e.g., a high aspect ratio); a high surface area; branching; twisted, bent, or curved filaments or branches; and the like that prevent close packing of the particles when the particles are part of a powder, and that results in the presence of substantial void space between the particles.

Examples of particle shapes that can result in a low relative apparent density include shapes that are branched, shapes referred to as "dendritic," and shapes referred to as "fibrous."

Dendritic particles include particles that have a dendritic morphology as described in U.S. Pat. No. 5,814,272. As presented therein, the term "dendritic" refers to a highly anisotropic, irregular morphology comprising one or more filaments individually having one dimension substantially greater than the other two dimensions of the filament. The filaments can be straight or bent and can also be branched or unbranched, with an irregular surface. Dendritic particles are characterized by low packing efficiencies compared to particles of more regular morphology and, therefore, form powders of lower apparent (bulk) density than those formed by particles of more regular morphology. Examples of dendritic particles include the Nickel 255 particles shown in FIG. 2A, and the treated stainless steel particles shown in FIG. 2C.

Dendritic particles can be prepared and processed in a manner to cause the particles to achieve a desired dendritic morphology and a useful relative apparent density. Examples of processes useful for producing dendritic particles having density properties as described are presented in U.S. Pat. No. 5,814,272, the entirety of which is incorporated herein by reference. As explained therein, particles can be processed to have a relatively low "relative apparent density" by processing the particles to be dendritic. In general, effective processing methods may include steps of: (1) heating a powder comprising non-dendritic particles, under conditions suitable to form a lightly sintered material; and (2) breaking the lightly sintered material to form a powder comprising dendritic particles.

The term "lightly sintered material" refers to a material that has been processed to cause fusion of metal powder particles through an initial stage of sintering, as defined by Randall (Randall in "Powder Metallurgy Science," second edition, German, ed., Metal Powder Federation Industry (1994), the contents of which are incorporated herein by reference). In the initial stage of sintering, or short-range diffusional sintering, bonds form between particles at contacted particle surfaces, resulting in the fusion of the particles with their immediate neighbors only. Thus, the initial stage of sintering yields a brittle structure of low mechanical strength. For a given material, sintering proceeds slowly beyond this initial stage at temperatures at the lower end of the material's sintering range. For the purposes of the present description, the term "initial stage sintering" refers to the sintering of a powder under conditions in which sintering does not proceed substantially beyond the initial stage.

Figure 2A:
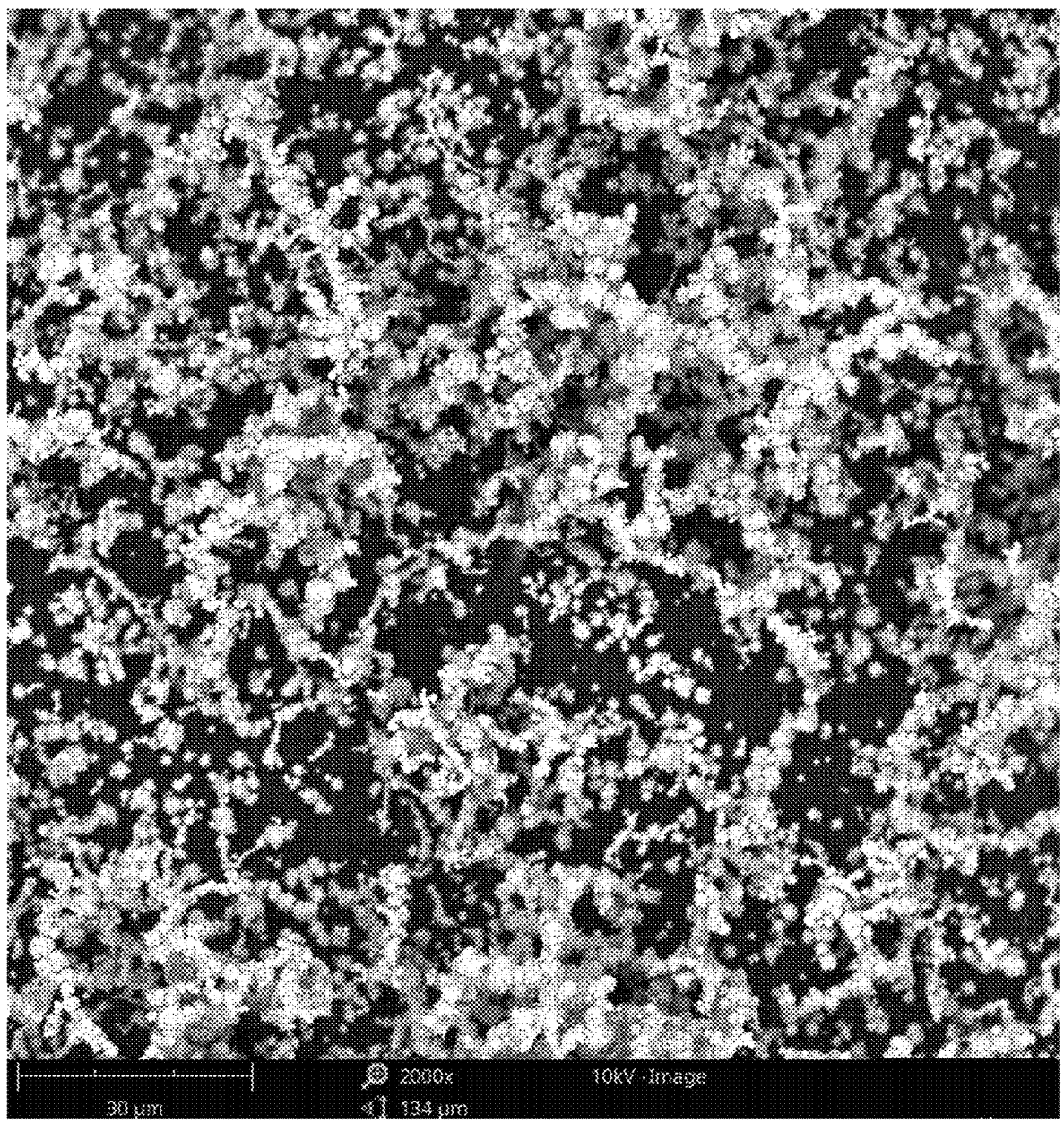
FIGS. 2A, 2B, 2C, and 2D show collections of inorganic (metal) particles that are described in the present description.
Figure 2B:
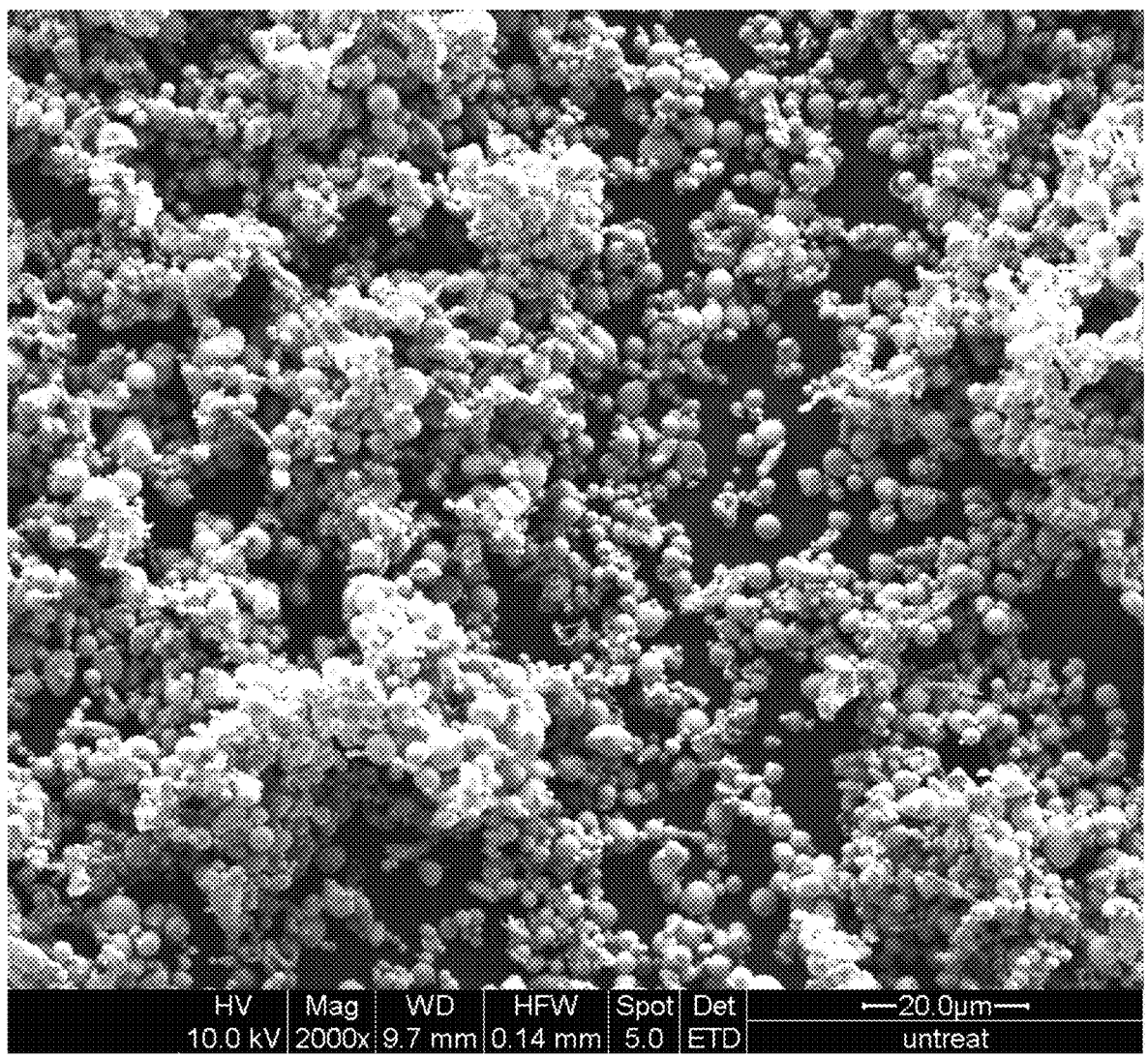
Figure 2C:
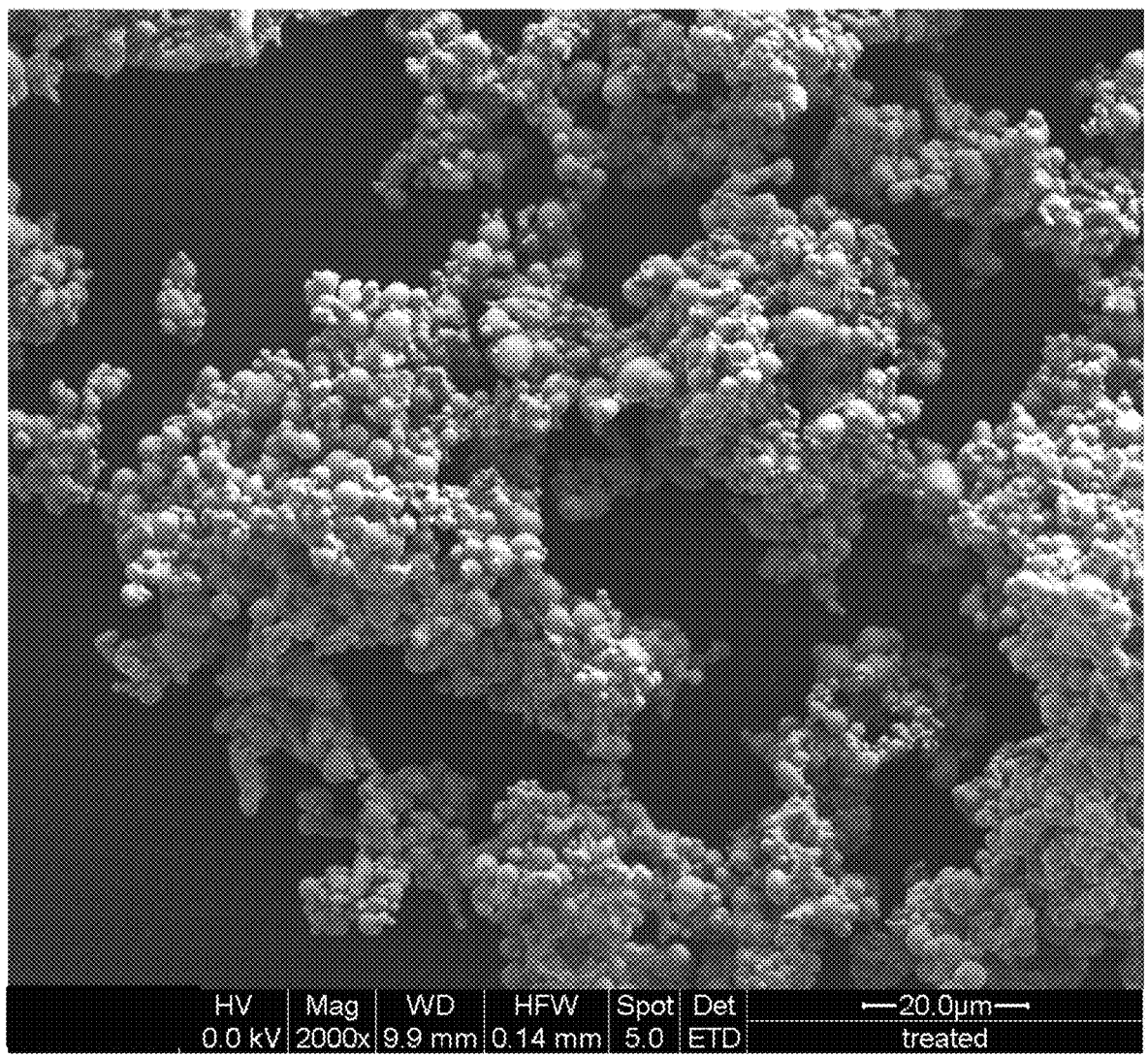

FIG. 2A is a photomicrograph that shows dendritic particles made of Nickel 255 (an example of a commercially pure nickel metal powder). FIG. 2B is a photomicrograph of stainless steel particles before processing the particles to have a dendritic form, and FIG. 2C is a photomicrograph of the stainless steel particles of FIG. 2B after processing to cause the particles to be dendritic.

Figure 2D:
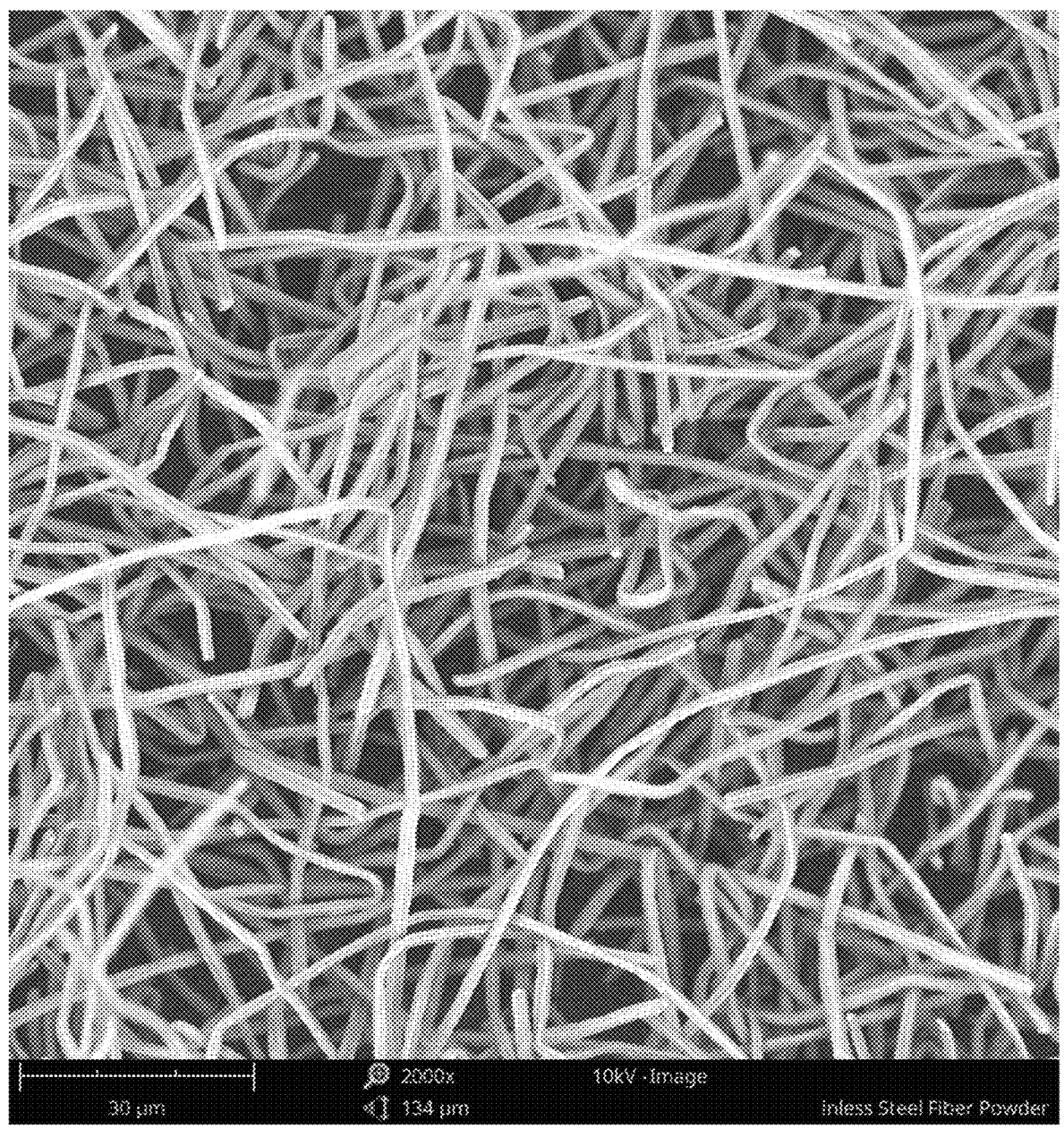

Another example of particles that are characterized by low packing efficiencies and a relatively low "relative apparent density" are particles referred to as "fibrous" particles. Fibrous particles are elongate (e.g., "noodle-like"), optionally curved or bent, with a high aspect ratio, such as an aspect ratio (ratio of length to diameter) of at least 10:1 (length:diameter), at least 30:1, at least 50:1, or at least 75:1 or at least 100:1. Examples of fibrous particles include fibrous stainless steel particles such as those shown in FIG. 2D.

Other types of inorganic particles in powder form, recognized as being non-dendritic and non-fibrous, are known and are also useful for preparing metal bodies by sintering. These particles exhibit a relatively high packing efficiency compared to dendritic or fibrous particles and do not normally (without being combined with dendritic or fibrous particles) have a low relative apparent density. Examples of these types of particles include particles that are generally (substantially) unbranched, that have a relatively low aspect ratio (e.g., below 5:1 or below 3:1 or below 2:1), including particle types referred to as spherical, rounded, angular, flaked, cylindrical, acicular, and cubic.

A collection of particles useful in a method as described, in the form of a powder and having a low relative apparent density, may contain particles that all have substantially the same or comparable size, shape, and morphology, e.g., a collection of all dendritic particles, or a collection of all fibrous particles. Alternately, if desired, a collection of particles may contain a combination of two or more different types of particles that have different size, shape, or morphology features. Particles of a powder may include, for example, a combination of both dendritic particles and non-dendritic particles, or a combination of both fibrous particles and non-fibrous particles, etc., with the combination having a relative apparent density sufficient to be processed to form a sintered porous body, and precursors thereof, as described.

A collection of particles can include one or more different types of inorganic particles, including particles made of metal, particles made of ceramic, or a combination of both ceramic particles and metal particles. Examples of useful particle can include collections of particles that are made substantially or entirely of metal particles, e.g., a collection of particles made of at least 90, 95, 99, or 99.9 weight percent metal (or metal alloy) such as steel particles (e.g., stainless steel), nickel particles, nickel alloy particles, or particles made of another metal or metal alloy. Commercial examples include those sold under the following designations: Nickel 255, "Alloy 22" (Hastelloy® C-22), and 316L Stainless Steel.

Nickel particles typically that contain at least 99 percent by weight nickel, with not more than a small amount of impurities such as carbon.

Examples of nickel alloys can be alloys that contain a combination of nickel (e.g., from 45 to 56 weight percent), chromium (e.g., from 15 to 30 weight percent), and molybdenum (e.g., from 8 to 18 weight percent), along with lower amounts of metals such as iron, cobalt, tungsten, manganese, silicon, carbon, vanadium, and copper. A specific example of a nickel alloy referred to generically as nickel "alloy 22" (e.g., HASTELLOY® C-22®) contains (weight percent): nickel (56 Balance), chromium (22), molybdenum (13), iron (3), cobalt (2.5 max), tungsten (3), manganese (0.5 max), silicon (0.08 max), carbon (0.01 max), vanadium (0.35 max), and copper (0.5 max).

An example of a stainless steel alloy is Stainless Steel Alloy 316L, which can contain (weight percent): chromium (16-18), nickel (10-14), molybdenum (2-3), manganese (2.0 max), silicon (0.75 max), carbon (0.08 max), phosphorus (0.045 max), sulfur (0.30 max), nitrogen (0.10 max), and iron (balance).

Useful and preferred particles as described can have an apparent density, and a relative apparent density, as described, with particular metal alloys having characteristic density properties and characteristic combinations of density properties.

Useful or preferred stainless steel particles may have an apparent density in a range from 0.5 to 2 grams per cubic centimeter, e.g., from 0.8 to 1.2 grams per cubic centimeter, and a relative apparent density in a range from 5 to 25, e.g., from 7 to 20 percent of theoretical density.

Useful or preferred nickel particles may have an apparent density in a range from 0.3 to 1.5 grams per cubic centimeter, e.g., from 0.4 to 0.8 grams per cubic centimeter, and a relative apparent density in a range from 4 to 17 percent of theoretical density, e.g., from 5 to 9 percent of theoretical density.

Useful or preferred particles made of nickel alloy having high amounts (weight percent) of: nickel (e.g., from 45 to 56 weight percent), chromium (e.g., from 15 to 30 weight percent), and molybdenum (e.g., from 8 to 18 weight percent), such as Hastelloy® C-22, may have an apparent density in a range from 0.5 to 2 grams per cubic centimeter, e.g., from 1.2 to 1.8 grams per cubic centimeter, and a relative apparent density in a range from 5 to 13 percent of theoretical density, e.g., from 7 to 11 percent of theoretical density.

An amount of particles in an injection composition can be an amount that is useful to produce a porous sintered body as described herein, with a porosity as described. Examples, on a per total volume basis, can be in a range from 20 to 50 volume percent based on total volume injection composition, e.g., from 25 to 45 percent. According to a useful process, the particles are combined with polymeric binder and optionally with one or more additional ingredients (e.g., to facilitate processing) to form an injection composition that can take the form of a liquid (e.g., at a "liquid binder temperature") that can be injected into a mold cavity, and that can also be solidified in the mold cavity (e.g., at a "solid binder temperature," with effective pressure), i.e., that can subsequently take the form of a solidified injection composition having a shape of the mold cavity. The polymeric binder may be a thermoplastic material or a thermosetting material, with thermoplastic materials being potentially preferred. A thermoplastic polymer composition is a polymer composition that can be reversibly heated and cooled to change between a heated liquid state and a cooled solid state.

A useful polymeric binder may be any polymeric binder (including combinations of binder materials) in which the particles can be dispersed, which may take the form of a liquid injection composition (e.g., at elevated temperature) and subsequently a form of a solidified injection composition (e.g., at a cooled temperature that may be an ambient temperature (25 degrees Celsius) or at another temperature that is below the elevated temperature). The polymeric binder also is a polymeric material that is sufficiently strong and cohesive to support the solidified injection composition after removing the solidified injection composition as a molded body from a mold cavity. The polymeric binder should also be capable of being completely or essentially completely cleaned from the particles with little or no residue remaining on the particles, to produce a porous sintered body having substantially no residue.

According to useful or preferred injection compositions, a polymeric binder can contain at least two different types of polymeric materials: a first polymeric binder (a.k.a. "primary binder") that can be removed using a liquid solvent (e.g., organic or aqueous), and a second polymeric binder (a.k.a. "secondary binder") that is not removed by exposure to liquid solvent but remains with the body after the first polymeric binder has been removed using liquid solvent. The second polymeric binder, sometimes referred to as a "backbone polymer" of a binder system, can be effective to support the particles as part of a molded body (e.g., a brown body) after the first polymeric binder has been removed and during subsequent processing.

A first binder, sometimes referred to as a "filler," is soluble in water or organic solvent either at ambient temperature (25 degrees Celsius) or, typically, at an elevated temperature, such as a temperature of from 40 to 80 degrees Celsius. Examples of organic solvents that can be effective for removing a first binder include heptane, hexane, HFE (hydrofluoroether), dichloroethylene, and trichloroethylene. As another example, polymer may be removed from a body by exposing the body to supercritical carbon dioxide.

Some non-limiting examples of types of first binders include waxes such as paraffin waxes, Carnauba wax, polyethylene glycol, agar, and mineral oil.

The amount of the first binder in an injection composition can be any amount that will allow processing as described herein, with examples being in a range from 10 to 25 weight percent based on total weight injection composition.

Example injection compositions also contain a second binder, sometimes referred to as a "backbone polymer," which is not soluble in water or organic solvent used for removing the first binder. The second binder will remain as part of the body (sometimes referred to as a "brown body") upon removal of the first binder. By remaining with the particles of the brown body, the second binder supports the brown body for further processing.

Examples of useful second binders include polymers that are stable (insoluble) in water and organic solvent used to remove a first binder, but that can be removed to a very high degree of removal (low residue) from a brown body by thermal treatment, e.g., in a furnace. Examples of useful secondary binders include certain polyolefins, polyacetals polyoxymethylene, polymethyl methacrylate, ethyl vinyl acetate, including homopolymers and copolyemers of these, and combinations of two or more of these types of polymers. Specific examples of commercially available polymers useful as a second binder include polypropylene and the Celanese Celon® M450 acetal copolymer.

The amount of the second binder in an injection composition can be any amount that will allow processing as described herein, with examples being in a range from 5 to 20 weight percent based on total weight injection composition.

As desired and deemed to be effective, other ingredients can also be included in the injection composition, including ingredients that are known and considered to be useful in injection molding methods. Examples include antioxidant, surfactants (including emulsifiers), lubricants, etc., in minor amounts.

Referring again to FIG. 1, one step of example process 100 is step (20) of mixing ingredients. During the mixing step the ingredients can be combined together and mixed until a uniform mixture is obtained. The ingredients may be entirely "dry," meaning that the ingredients are in substantially solid form and do not contain a liquid ingredient, in which case the mixing step is a "dry mixing step." Dry ingredients can include polymer binder (e.g., first binder and second binder), inorganic (e.g., metal) particles, and any other dry ingredients such as antioxidant, surfactant, lubricant, etc.

Alternately, ingredients of a mixing step are not required to be "dry" or in solid form. A mixing step can be performed to mix ingredients that include one or more ingredients in liquid form, and may be a "wet mixing" step. For example, a mixing step may include combining ingredients that include a liquid polymer ingredient, e.g., polymer that is dissolved in solvent. As a single example of a liquid polymer ingredient, polyethylene glycol (among many other polymers) may be in a solid (dry) form, or may instead be dissolved in water or organic solvent during a mixing step.

The mixture of a mixing step can comprise, consist of, or consist essentially of the binder (e.g., first binder and second binder), the inorganic (e.g., metal) particles, and other optional dry ingredients. As used herein, an ingredient, composition, or combination of ingredients that "consists essentially of" a designated ingredient, composition, or combination of ingredients is considered to contain the listed ingredient, composition, or combination of ingredients and not more than an insignificant amount of other materials, e.g., less than 5, 2, 1, or 0.5 weight percent of any other materials based on the total weight of the ingredient, composition, or combination of ingredients.

After a dry mixing step, the mixed dry ingredients can be further combined by a compounding step (30) to form feedstock that can be used as a liquid injection composition in a molding step. The compounding step is typically performed at a temperature at which the ingredients take a form of a liquid. Example temperatures for a compounding step can be above ambient temperature (25 degrees Celsius), such as in a range from 125 to 200 degrees Celsius (depending on the types of polymers). After compounding the mixture can be cooled to form a pelletized feedstock in solid form (e.g., at room temperature), which can then be placed into an injection molding system and heated to re-melt the polymers and form a liquid injection composition that can be dispensed (e.g., injected) into a mold cavity to form a molded body. The particles in the liquid injection composition can be present in a useful volume, by percent total volume, for surfaces of the particles to be in sufficient proximity or contact with each other to allow the particles to produce a resultant porous sintered body that is self-supporting, but still has a porosity as described herein, e.g., in a range from 20 to 50 percent.

A next step can be a step of injection molding (40). This step can include re-melting a solid feedstock produced during the compounding step to form a liquid injection composition that is injected into a mold cavity, allowing or causing the liquid injection composition to solidify within the mold cavity (e.g., by a reduction in temperature and an increase in packing pressure) to form a solidified injection composition, and removing the solidified injection composition from the mold in the form of a molded body that contains the particles dispersed in solid (solidified) polymeric binder.

The molded body is then processed to remove the polymers (binder) from the particles, and to fuse the particles. For example, as shown in FIG. 1, the molded body can be processed by a water/solvent debinding step (50) by which the molded body is contacted with solvent, which may be organic, water, or a combination of water and organic solvent. The solvent removes from the molded body any amount of polymeric binder or other solid (non-particle) material that is soluble in the solvent (i.e., the primary binder). The remaining body (which can be referred to herein as a "brown body") includes the particles suspended in the remaining polymer binder (the secondary binder), optional antioxidant and surfactant, etc., that are not soluble in the solvent. The water/solvent debinding step is performed by exposing the molded body to the solvent at conditions, e.g., temperature, sufficient to remove substantially all of the water or solvent-soluble materials, including the first (primary) binder. The temperature of a water/solvent debinding step may be any effective temperature, such as a temperature in a range from 40 to 80 degrees Celsius.

By example steps of a process 100 of FIG. 1, the brown body is then exposed to heat in a thermal debind step (60) to remove polymer (second or "secondary" binder) and any other remaining non-particle materials from the brown body, such as antioxidant, surfactant, etc. In this step the brown body is exposed to an elevated temperature that is sufficient to remove the remaining solid (non-particle) materials and to provide a substantially residue-free porous body that includes substantially only the particles, which form a self-supporting structure but are not yet interconnected by fusing. For example, after a thermal debind step (or, alternately after a sintering step) the porous body can contain not more than 1, 0.5, 0.1, 0.05, or 0.01 weight percent of any component of the binder, antioxidant, surfactant, etc., i.e., contains at least 99, 99.5, 99.9, 99.95, or 99.99 weight percent particles of the injection composition.

A temperature of a thermal debind step can be any temperature useful to substantially remove binder and other solid, non-particle materials from the brown body (but without causing sintering or melting of the particles). The specific temperature can depend on features such as the type of polymers as well as the morphology and composition (and sintering and melting temperatures) of the particles. In certain embodiments, a thermal debind step can be performed by slowly increasing temperature, with temperature "holds" or plateaus (periods of constant temperature) based on thermogravimetric analysis (TGA) profiles of the polymer of the brown body. Any rate of increase of a temperature during a thermal debind step (a "ramp rate") may be as useful, with an example rate being 2 degrees Celsius per minute. A maximum temperature reached during a thermal debind step may be as useful depending on the type of polymers, with an example being at most 500 or at least 600 degrees Celsius. Typically a thermal debind temperature does not exceed 600 degrees Celsius.

The porous body is also exposed to a sintering step (70) to cause the particles to become fused and connected. The term "sintering" as used herein has a meaning that is consistent with the meaning that this term is given when used in the arts of porous sintered metal structures, such as porous sintered metal membranes of the type that may be used as a metal filter membrane. Consistent therewith, the term "sintering" can be used to refer to processes of bonding (e.g., "solid state welding" or "fusing") together a collection of small, sinterable particles of one or more different types (sizes, compositions, shapes, etc.) by applying heat to the particles (i.e., to the porous body) in a non-oxidizing environment so that surfaces of the particles reach a temperature that causes the particle surfaces to become fused together by a physical (mechanical) bond between the particles surfaces, but that does not cause the particles to melt (i.e., none of the metal materials reaches its melting temperature).

The sintering step is performed at a temperature that is above the sintering point of particles of the body, but below the melting temperature of the particles. As used herein, a "sintering point" of a particle is a temperature at which the material of the particle is capable of being sintered, i.e., a temperature at which the particles begin adhering to other particles of the body being sintered, and can be fused to another particle, e.g., at a particular pressure such as at atmospheric pressure. A sintering point of a material (e.g., metal) is normally below a melting temperature of the material, meaning the temperature at which the metal becomes liquid.

Thus, a useful temperature for performing a sintering step can depend on the composition of the particles, and the sintering point of the particles, as well as the size of the particles being sintered, e.g., whether the particles are "coarse" (larger) or fine (smaller). For nickel, a sintering point may be in a range from 550 to 750 degrees Celsius, and a sintering step may be performed at a temperature in a range from 550 to 800 degrees Celsius. For nickel and stainless steel alloys, a sintering point may be in a range from 950 to 1250 degrees Celsius, and a sintering step may be performed at a temperature in a range from 950 to 1300 degrees Celsius. The sintering step can be performed in a furnace or oven and in a non-oxidizing atmosphere that will not react with or otherwise detrimentally affect the metal particles of the body being sintered, e.g., in a vacuum or in an atmosphere of concentrated or pure hydrogen, concentrated or pure inert gas, or a combination of concentrated or pure hydrogen and inert gas.

By one example method, with added detail, an injection composition can be prepared using known polymeric compounding equipment such as a twin screw extruder or prep mixer, and using a binder system that includes a first solvent-soluble binder, and a second solvent-insoluble binder, with optional processing aids such as surfactant, antioxidant, lubricant, etc. The compounded feedstock (injection composition) can be pelletized to be used in an injection molding machine. The injection composition can be injection molded by methods similar to traditional plastic or metal injection molding processes. A molded body formed by the injection molding step can be debound in two separate steps. The first (solvent) debinding step exposes the molded body to a heated water or solvent bath to remove the primary binder component and creating a brownform. A second (thermal) debinding step can be performed to remove the secondary binder and additives thermally, in a furnace to leave behind a substantially residue-free self-supporting particle structure. This structure is then sintered to its final density in a furnace containing a non-oxidizing, e.g., hydrogen, inert gas, or vacuum atmosphere, to achieve the desired porosity for metal membrane.

A porous sintered body prepared according to a method as described may be useful as a filter membrane for filtering gases, e.g., gases used in semiconductor processing. Various features of porous sintered bodies are considered to affect the usefulness of the porous body as a filter membrane. In filtering gaseous materials for use in semiconductor processing, the gaseous fluid may be supplied at a pressure that is approximately atmospheric (e.g., under 2 atmospheres), above atmospheric pressure, or below atmospheric pressure (e.g. vacuum conditions). The process that uses the gaseous fluid may require a very high removal rate of nano-scale and micron-scale particles, e.g., at least 3, 4, 5, 7, or 9 as measured by "log reduction value" (LRV) of a filtering step. The process of filtering these gaseous materials also may be performed at relatively low flow-rates, e.g., below 50, 25, 10, 5, 2, 1, or 0.5 standard liters per minute (slpm) per square centimeter of frontal filter area. Methods as described herein can be useful to prepare filter membranes that meet requirements such as these, to allow the filter membrane to be used effectively as a filter membrane, for example for filtering a gaseous material for use in semiconductor processing.

Advantageously, a sintered porous body formed by a step of injection molding can be prepared to have any of a very large variety of three-dimensional shapes, including certain types of shapes that may not be possible to produce by previous non-injection molding techniques for forming porous bodies of the type useful as a filter membrane.

Example shapes of an injection molding membrane can be generally three-dimensional, including forms that are non-tubular (e.g., somewhat or substantially flat or planar), and forms that are tubular, which include a substantially annular or cylindrical forms or modifications thereof.

Figure 3A:
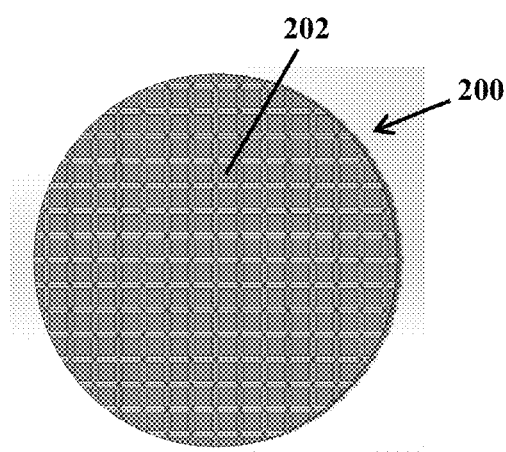
FIGS. 3A, 3B, 3C, and 3D show various shapes of example injection molded sintered porous bodies described herein.
Figure 3B:
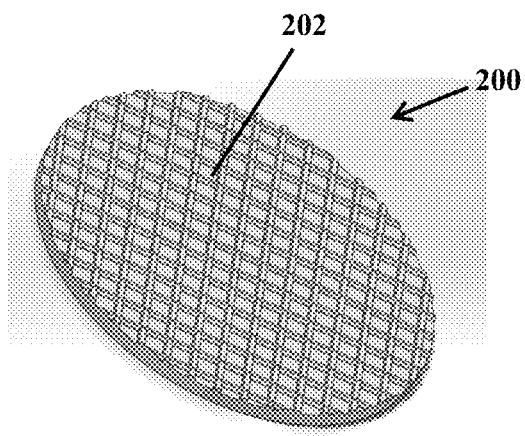
Figure 3C:
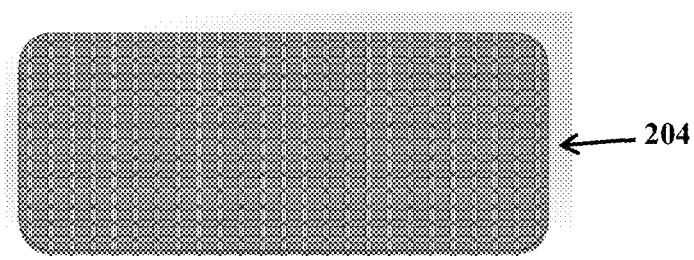
Figure 3D:
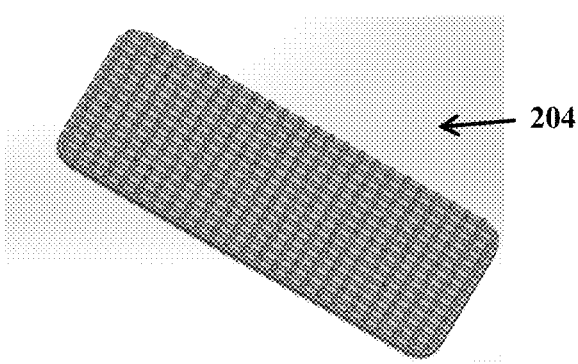

Examples of non-tubular shapes may be in the form of a flat, curved, or rounded plate or "cup," which has two opposed major surfaces and a thickness between the two opposed surfaces. The opposed major surfaces may be generally flat or curved and additionally may have a surface structure that is either flat or that includes a non-flat patterned or non-patterned three-dimensional structure such as raised ridges or walls, depressions or channels, or "waffling." Referring to FIGS. 3A, 3B, 3C, and 3D, FIGS. 3A and 3C are top views, and FIGS. 3B and 3D are perspective views of filter membranes 200 and 204 that can include two opposed major surfaces having a width and a length, and a thickness between the two surfaces that is substantially less than the width and the length. At least one surface (e.g., surface 202 of FIGS. 3A and 3B) may include a three-dimensional structure, including a repeating or a non-repeating pattern of depressions (e.g., sunken channels) or elevated or raised ridges, walls, or the like, with one example being a waffling pattern as shown in FIGS. 3A, 3B, 3C, and 3D. Other shapes of surface structures and patterns are also possible using the presently-described injection molding technique.

Figure 4A:
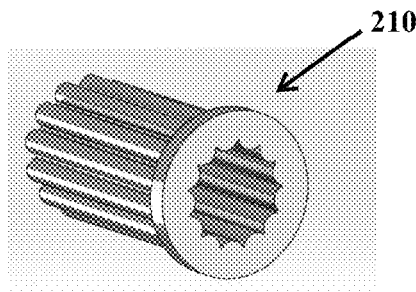
FIGS. 4A and 4B show an example injection molded sintered porous body as described herein.
Figure 4B:
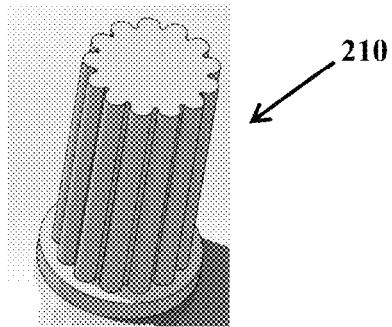

Alternately, a porous sintered body may be three dimensional, e.g., a tubular membrane, such as in the form of a tube (e.g., annulus, cylinder) having a round or circular cross-section when viewed along an axis of the tube, i.e., a cylinder. Other tubes may have non-circular shapes in cross section, such as a shape that includes a repeating pattern of angles, corners, curves (e.g., fluting), or a pleated pattern (multi-pointed star, or a circular "zig-zag" pattern) extending about an interior or an exterior surface of the tube. The membrane (in any shape) includes two opposed major surfaces and a thickness between the two opposed major surfaces. At least one end of a tubular membrane can be open, and a second end may be opened or closed. FIGS. 4A and 4B show perspective views of annular filter membrane 210 having a non-circular cross section that includes multiple repeating curved surfaces, e.g., "pedals" or "fluting," with one open end and one closed end.

As used herein, a body referred to as an "injection molded porous sintered body" (or an "injection molded body," etc.) is a body that is structurally or physically identifiable as a body that has been produced by an injection molding step, i.e., that includes a physical feature that is indicative of the body being formed by an injection molding technique. During injection molding, a mold cavity with mold surfaces is used to form a shape of a molded body. The mold cavity includes one or more structural features that produce a distinctive physical marking at a surface of a body prepared by the mold. Example mold cavities can include a mold number at a mold surface, a parting line (a boundary or edge where two pieces of a mold come together), an injector pin, a gate or gate opening, among others. These or other structures of a cavity mold can form a physical mark (an "injection molding mark") that remains at a surface of a body formed using the mold. Thus, an "injection molded porous sintered body" can be identified by the presence of one or more of these injection molding marks, such as a parting line mark (formed by a parting line), an injector pin mark (formed by an injection pin), a gate mark (formed by a gate or a gate opening), or a cavity number (formed by a cavity number mark at a mold surface).

Example binder components are shown in Table 1 and Table 2 below:

TABLE 1

Wax Binder System

| Material | Purpose |
|---|---|
| Paraffin Wax (approx. 11% by weight) | Primary Binder: These waxes will be removed from the parts during the solvent debind. |
| Carnauba Wax (approx. 3% by weight) | |
| Polypropylene (approx. 5% by weight) | Secondary Binder (aka backbone): This will be removed during thermal debinding |
| Stearic Acid (approx. 1% by weight) | Lubrication: This is added so that the binder components and metal powder mix well. This will be removed during thermal debinding. |

TABLE 2

Water Binder System

| Material | Purpose |
|---|---|
| M450 (POM) (approx. 13% by weight) | Secondary Binder (aka backbone): These waxes will be removed from the parts during the solvent debind. |
| PEG (approx. 22% by weight) | Primary Binder: This will be removed during the water debinding process |

TABLE 2-continued

Water Binder System

| Material | Purpose |
|---|---|
| Myverol 18-06k (approx. 1% by weight) | Food-Grade Emulsifier: Added to ensure that binder components and metal powder mix well. This will be removed during thermal debinding. |
| MD1024 (approx. 1% by weight) | Antioxidant and metal deactivator: Added to ensure there are no chemical reactions with the metal powders. This is removed during thermal debinding. |

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in the details, particularly in matters of shape, size, and arrangement of parts without exceeding the scope of the disclosure. The disclosure's scope is, of course, defined in the language in which the appended claims are expressed.

In a first aspect, a method of making a porous sintered body by particle injection molding a liquid injection composition into a shaped mold cavity comprises: flowing the liquid injection composition into the shaped mold cavity, wherein the liquid injection composition comprises: at least one polymeric binder, and from 20 and 50 percent by volume solid inorganic particles, based on total volume of the liquid injection composition; and causing the polymeric binder to solidify within the shaped mold cavity to form a solidified injection composition comprising solid binder surrounding the solid inorganic particles.

A second aspect according to the first aspect further comprises: removing the solidified injection composition from the mold cavity, removing the solid binder from the solidified injection composition to form a porous non-sintered body, and sintering the porous non-sintered body to form a porous sintered membrane.

A third aspect according to according to the first or second aspect is wherein the solid inorganic particles are dendritic or fibrous and have an apparent density below 2.0 grams per cubic centimeter.

A fourth aspect according to any preceding aspect is wherein the solid inorganic particles have a relative apparent density that is in a range from 5 to 35 percent of a theoretical density of the particles.

A fifth aspect according to any preceding aspect is wherein the porous sintered membrane has a porosity in a range from 50 to 80 percent.

A sixth aspect according to any preceding aspect is wherein the polymeric binder comprises thermoplastic polymer selected from: a wax, polypropylene, polyethylene glycol, polyoxymethylene, polymethyl methacrylate, ethyl vinyl acetate, and a combination thereof.

A seventh aspect according to any preceding aspect is wherein the polymeric binder comprises a primary binder that can be removed from the solidified injection composition by contacting the solidified injection composition with a liquid solvent selected from water, organic solvent, and a combination thereof, at a temperature in a range from 40 to 80 degrees Celsius.

An eighth aspect according to the seventh aspect is wherein the primary binder is selected from: a wax and polyethylene glycol.

A ninth aspect according to the seventh or eighth aspect further comprises removing the primary binder from the solidified injection composition by contacting the solidified injection composition with a liquid solvent selected from water and an organic solvent at a temperature in a range from 40 to 100 degrees Celsius.

A tenth aspect according to the ninth aspect is wherein the organic solvent is selected from heptane, hexane, hydrofluoroether, dichloroethylene, trichloroethylene, and mixtures thereof.

An eleventh aspect according to the seventh through tenth aspect is wherein the polymeric binder comprises a secondary binder that can be removed from the solidified injection composition by heating the solidified injection composition to a temperature of not more than 600 degrees Celsius.

A twelfth aspect according to the eleventh aspect is wherein the secondary binder is selected from: polypropylene, polyoxymethylene, polymethyl methacrylate, ethyl vinyl acetate.

A thirteenth aspect according to the ninth through eleventh aspect further comprises, after removing at least a portion of the primary binder, heating the solidified injection composition to a temperature of not more than 600 degrees Celsius to remove solid binder.

A fourteenth aspect according to any of the preceding aspects is wherein the porous sintered body is an annular filter membrane having a shape comprising a three-dimensional tube.

A fifteenth aspect according to the fourteenth aspect is wherein the tube has a circular cross-section when viewed in a direction of an axis of the tube.

A sixteenth aspect according to the fourteenth aspect is wherein the tube has a non-circular cross-section when viewed in a direction of an axis of the tube.

A seventeenth aspect according to the sixteenth aspect is wherein the non-circular cross-section comprises a pleated pattern.

An eighteenth aspect according to any of the preceding aspects is wherein the porous sintered body is a three-dimensional non-tubular filter membrane.

In a nineteenth aspect, a liquid injection composition comprises: from 50 to 80 percent by volume polymeric binder, and from 20 and 50 percent by volume solid inorganic particles having a relative apparent density in a range from 5 to 35 percent of a theoretical density of the particles, based on total volume of the liquid injection composition.

A twentieth aspect according the nineteenth aspect is wherein the inorganic particles are dendritic or fibrous and have an apparent density below 2.0 grams per cubic centimeter.

In a twenty-first aspect, an injection molded porous sintered body comprises sintered particles and having a porosity in a range from 50 to 80 percent.

A twenty-second aspect according to the twenty-first aspect is wherein the particles are dendritic particles.

A twenty-third aspect according to the twenty-first aspect is wherein the particles are fibrous particles.

A twenty-fourth aspect according to the twenty-first through twenty-third aspects is in the form of an annular filter membrane having a shape comprising a three-dimensional tube.

A twenty-fifth aspect according the twenty-fourth aspect is wherein the tube has a circular cross-section when viewed in a direction of an axis of the tube.

A twenty-sixth aspect according to the twenty-fourth aspect is wherein the tube has a non-circular cross-section when viewed in a direction of an axis of the tube.

A twenty-seventh aspect according to the twenty-sixth aspect is wherein the non-circular cross-section comprises a pleated pattern.

A twenty-eighth aspect according to the twenty-first through the twenty-third aspects comprises two opposed major surfaces and a thickness between the two opposed surfaces and having a non-cylindrical shape.

A twenty-ninth aspect according to the twenty-eighth aspect is wherein at least one major surface has structure comprising raised ridges, channels, or a pattern such as waffling.

A thirtieth aspect according to the twenty-first through the twenty-ninth aspects further comprises an injection mold marking.

A thirty-first aspect accord to the twenty-first through twenty-ninth aspects further comprises one or more of: a parting line mark (formed by a parting line of a mold), an injector pin mark (formed by an injection pin of a mold), a gate mark (formed by a gate or a gate opening of a mold), or a cavity number (formed by a cavity number mark at a mold surface).

What is claimed is:

1. A method of making a porous sintered body by particle injection molding a liquid injection composition into a shaped mold cavity, the method comprising:
    flowing the liquid injection composition into the shaped mold cavity, wherein the liquid injection composition comprises:
    at least one polymeric binder, and
    from 20 and 50 percent by volume solid metal particles, based on total volume of the liquid injection composition;
    causing the polymeric binder to solidify within the shaped mold cavity to form a solidified injection composition comprising solid binder surrounding the solid metal particles;
    removing the solidified injection composition from the mold cavity;
    removing the solid binder from the solidified injection composition to form a porous non-sintered body; and
    sintering the porous non-sintered body to form a porous sintered membrane, wherein the porous sintered membrane has a porosity in a range from 50 to 80 percent.

2. The method of claim 1, wherein the solid metal particles are dendritic or fibrous and have an apparent density below 2.0 grams per cubic centimeter.

3. The method of claim 1, wherein the solid metal particles have a relative apparent density that is in a range from 5 to 35 percent of a theoretical density of the particles.

4. The method of claim 1, wherein the polymeric binder comprises thermoplastic polymer selected from: a wax, polypropylene, polyethylene glycol, polyoxymethylene, polymethyl methacrylate, ethyl vinyl acetate, and a combination thereof.

5. The method of claim 1, wherein the polymeric binder comprises a primary binder that can be removed from the solidified injection composition by contacting the solidified injection composition with a liquid solvent selected from water, organic solvent, and a combination thereof, at a temperature in a range from 40 to 80 degrees Celsius.

6. The method of claim 5, further comprising removing the primary binder from the solidified injection composition by contacting the solidified injection composition with a liquid solvent selected from water and an organic solvent at a temperature in a range from 40 to 100 degrees Celsius.

7. The method of claim 5, wherein the polymeric binder comprises a secondary binder that can be removed from the solidified injection composition by heating the solidified injection composition to a temperature of not more than 600 degrees Celsius.

8. The method of claim 1, wherein the porous sintered body is an annular filter membrane having a shape comprising a three-dimensional tube.

9. The method of claim 1, wherein the porous sintered body is a three-dimensional non-tubular filter membrane.

10. A liquid injection composition comprising:
   from 50 to 80 percent by volume polymeric binder, and
   from 20 and 50 percent by volume solid metal particles having a relative apparent density in a range from 5 to 35 percent of a theoretical density of the metal particles, based on total volume of the liquid injection composition.

11. The composition of claim 10, wherein the solid metal particles are dendritic or fibrous and have an apparent density below 2.0 grams per cubic centimeter.

\* \* \* \* \*